INVENTOR.
David L. Paulding.
BY Maxwell E. Sparrow.
ATTORNEY.

May 5, 1959  D. L. PAULDING  2,885,526
ELECTRIC OVEN
Filed April 20, 1956  2 Sheets-Sheet 2
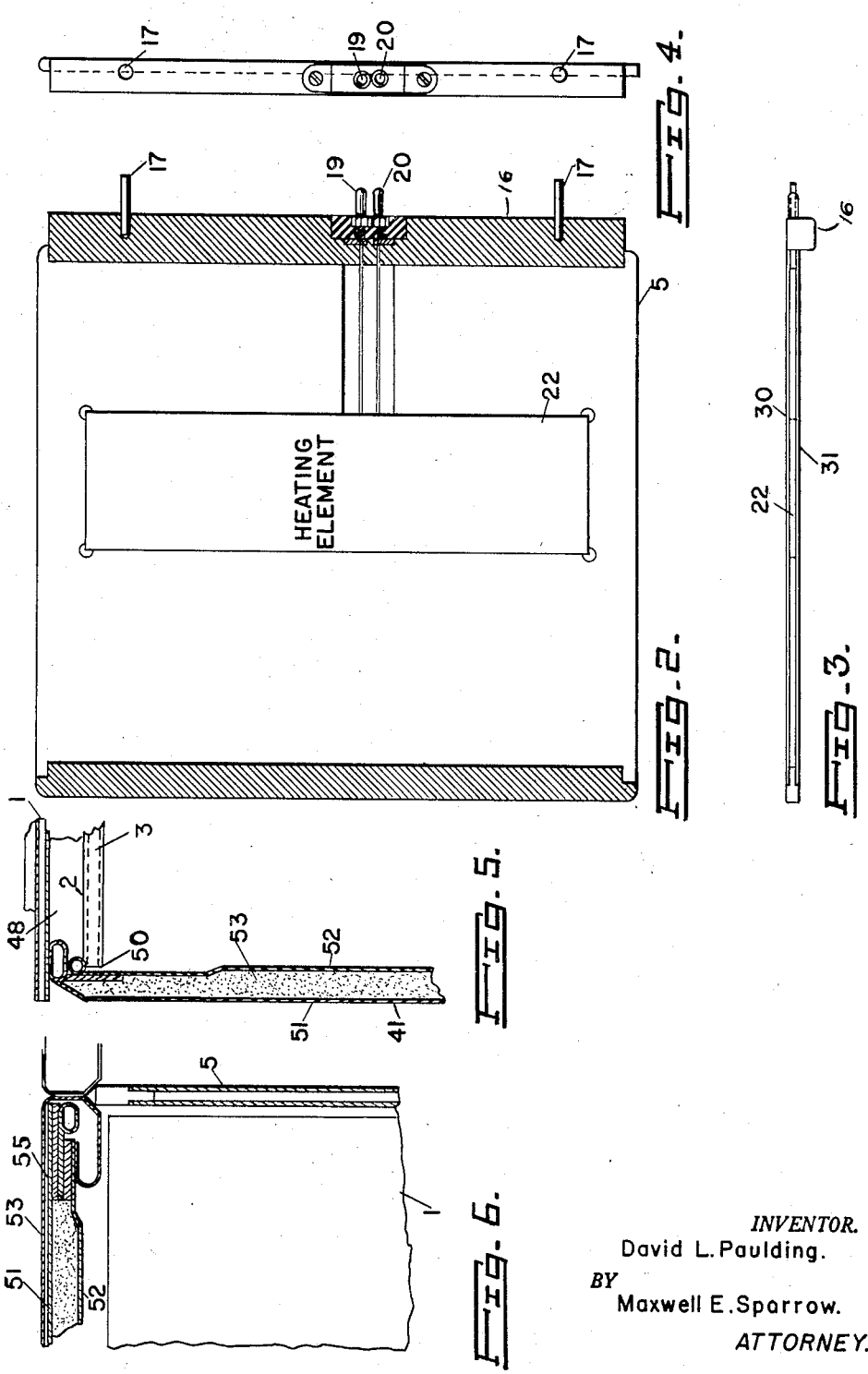
INVENTOR.
David L. Paulding.
BY
Maxwell E. Sparrow.
ATTORNEY.

United States Patent Office 2,885,526
Patented May 5, 1959

2,885,526

ELECTRIC OVEN

David L. Paulding, Massapequa Park, N.Y., assignor to Ref Manufacturing Corporation, Mineola, N.Y., a corporation of New York Application April 20, 1956, Serial No. 579,525

5 Claims. (Cl. 219—35)

This invention relates to electric ovens and in particular electric ovens of the type for storing and keeping warm food in ovens used on commercial airliners and the like.

Ovens generally used on commercial airliners of necessity must be compact and light in weight. Because of these limitations, only a certain amount of food can be stored. Further, many short hops prevent the possibility of serving food because of the limited time, sufficient time being necessary to prepare proper and adequate meals.

Therefore, it is an object of this invention to provide an improved type of electric oven for aircraft use.

It is another object of this invention to provide a very efficient practical, economical, light weight and safe electric oven void of any moving elements or parts therein.

Still another object of this invention is to provide food storage facilities for a large number of passengers.

A still further object of this invention is to provide a large number of meals in as short a time as possible for short hop passengers.

Still further and specific objects, features and advantages will clearly appear from a detailed description given below when taken in connection with the accompanying drawings which form a part of this specification and illustrate merely by way of examples certain embodiments of the invention.

In the following description and in the claims, parts will be identified by specific names for convenience, but such names are intended to be as generic in their application to similar parts as the art will permit. Like reference characters denote like parts in the several figures of the drawings.

Figs. 2, 3 and 4, are different views of the heating panel which forms a removal part of the oven;

Fig. 5 shows a sectional side view of the oven-door in its closed position; and

Fig. 6 shows a view of the lower end of the door when it is completely in an opened position.

Figure 1:
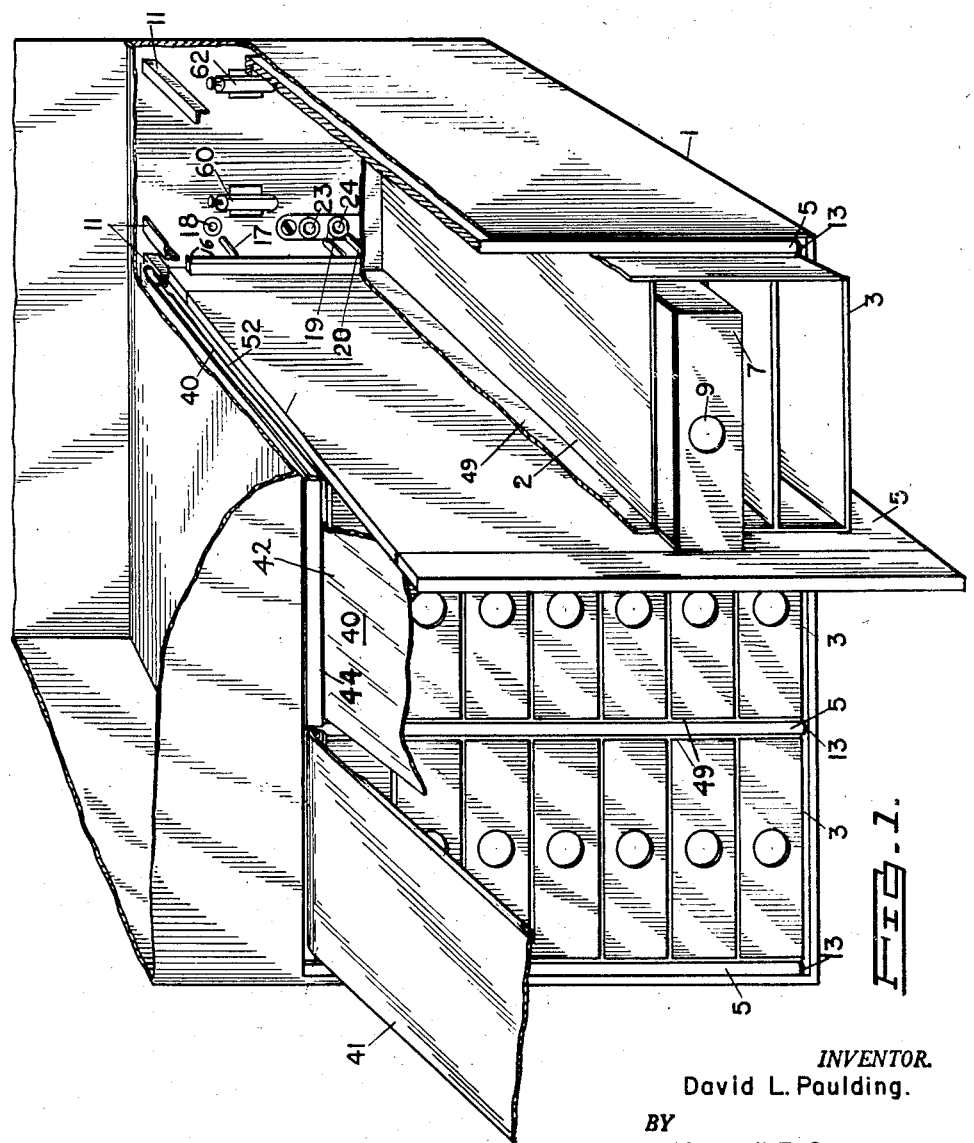
Fig. 1 is an isometric drawing of an electric oven according to the invention, showing a portion thereof, exposed.

Referring more specifically to the drawings, Fig. 1 discloses an oven particularly adapted for use in airplanes although the same may be used in other vehicles and environments where safety, weight and convenience is required and space is restricted. The oven is preferably made of aluminum and/or stainless steel construction designed for long service under substantially all types of operating conditions.

The oven is of the type which is so designed that heat is transferred to the parts which require heating, by conduction, rather than by convection or forced air. This eliminates need for circulating air means and makes for fewer and less costlier moving parts thereby preserving precious weight essential to air transportation.

In its broader aspect, the oven is comprised of a housing 1, preferably of light weight metal such as aluminum having good heat conductive properties. The housing is comprised of three separate and individual compartments 3, each compartment being completely separated and isolated by a heating panel 5 in the vertical dimensions as normally viewed. There are four heating panels 5, said panels disposed in vertical parallel array, one at each extremity of the housing and the remaining two disposed intermediate the end panels and equidistant therefrom thereby forming the boundaries of the said compartments, each compartment being of equal dimensions as to width, height and depth.

Each compartment 3, comprises a single independent structural unit which is portable, being removable and replaceable from the housing 1. The structure has a plurality of integral shelf-like members 2 each separated by a space, sufficient to accommodate a portable tray, drawer array, one above the other.

Also every compartment 3 has disposed therein a plurality of food trays 7, each tray being individually supported and removable, and arranged one above the other in a vertical tier relationship. Each tray 7, has an aperture 9 centrally located at the frontal vertical portion thereof, said aperture providing free and easy access to said tray for removal, handling and otherwise deposing thereof. The tray 7 is preferably of light weight, durable metal, having a rectangular base configuration with vertical sides at the extremities thereof, with no covering or other protruding elements at the uppermost portion of said vertical sides.

As previously stated, the heating panels 5 separate each of the compartments 3, making each compartment separate unto itself. The panels 5 are positioned within the metal housing 1 by angle rods 11 at its vertical uppermost extremities and by grooved semi-circular recesses 13 at its bottom-most vertical portion. The said angle rods 11 and grooved recesses 13 form parallel guide-rails along which the said panel 5 is slidably guided and along which the panel can be inserted, removed or interchanged with other similar panels having the same dimensional configuration. Located and integral with said panel at a point intermediate said uppermost and bottom-most portions on the vertical back-end edge portion 16 thereof, are a pair of dowel rods 17 adapted to engage and penetrate a pair of dowel-cavities or recesses 18 to properly position said panel 5 and prevent any lateral motion due to vibrations and the like. Positioned mid-way said back-end edge-portion 16 are a pair of electrical male contact plugs 19, 20 each insulated from the other and sufficiently removed to prevent any arc-over. The said plugs 19, 20 are electrically connected to the heating element 22 centrally located within the panel and electrically insulated therefrom. The plugs, 19, 20 are adapted to engage and penetrate a set of female-receptacles 23, 24 which are positioned at the rear of housing 1 and integral therewith, and so aligned with said panel to be in the same vertical plane as said panel. The receptacles are adapted to receive electrical energy from any local supply available and preferably having a rating normal to commercial aircraft use. There are for each and every heating panel 5, a corresponding set of receptacles, 23, 24 provided so that each heating element 22 may be properly energized, each and every set of receptacles being appropriately aligned as detailed above for each and every panel.

Figure 2 shows a detailed view of heating panel 5 and the general location of heating element 22; with respect to said panel. The element 22 is of the type normally used in electrical heaters and preferably made from Nichrome or German silver wire and capable of withstanding voltages and currents normally used in commercial aircraft and the like. The heating element is centrally located in said panel and completely enclosed therein between a pair of sheet panelings 30, 31, preferably made of aluminum, and electrically insulated therefrom. The panel 5 is a completely sealed enclosure enabling the immersing thereof in any solvent solution for cleaning purposes without damage caused thereby to the internal structure or elements. The element 22 causes heat to radiate therefrom to the heat conduction paneling 30, 31 which in turn conducts its heat to the surrounding food trays continuously, efficiently and in a minimum amount of time, with no moving parts or elements.

Referring now to Fig. 1, located at the front of the structural housing 1 are three compartment doors of which only two, 40 and 41 are shown, each pivotally hinged at its uppermost extremity along its edge portion 44 and each adapted to cover its respective compartment 3 having a plurality of food trays 7 disposed therein. The doors 40 and 41 are preferably of light-weight metal such as aluminum and the like, and gravity actuated when pivotally hinged at its upper extremity end in a closed position, covering the respective trays of each separate compartment, sufficiently so, to prevent any contamination of the said trays. The doors 40 and 41 may be opened and slidably made to telescopically fit into that region of the uppermost horizontal section of the compartment 3 and the shell-like structure 49 wherein the trays 7 are supported.

Fig. 5 shows a sectional plan view of the ovendoor 41 when said door is in closed relationship to the tray compartment. The door 41 pivotally hinges about a rod-portion 50, the door having free radial movement about the said rod as a focal point, and is freely movable in an inwardly horizontal direction after the said door transcends an arc sufficient at its upper extremities to be in a plane parallel to said uppermost horizontal section of housing 1. In this position, the door 41 is then free to slidably move into that region 48 as previously stated, thereby making free and easy access to the food trays. Fig. 5, further shows the door 41 as a shell like structure having a pair of sides 51, 52, preferably of light-weight sheet metal encompassing or bounding a given volume, said volume being composed of air cr any non-conductive heat insulation 53 of a similar character or nature. This type of door further prevents the loss of any heat from the respective food trays, by virtue of this insulating property.

Fig. 6 shows another view of the door structure when said door is in an open position and completely slid back in that region 48 of the housing 1 supplied for the purpose. The door slides along a channel enclosure 55, the said enclosure transcending a path in a direction from front to back of said housing 1 at the upper extremities thereof immediate the top portion of said compartment 3 and positioned either side of said compartment.

Referring again now to Fig. 1, there is provided a pair of thermostats 60, 62 in each of the three sections adapted to maintain a constant range of temperature in accordance with predetermined requirements; one of the thermostats provides a high range limit and the other provides a low range limit.

While the invention has been described and illustrated with respect to certain particular preferred examples which give satisfactory results, it will be understood by those skilled in the art after understanding the principle of the invention, that various changes and modifications may be made without departing from the spirit and scope of the invention and it is intended therefore in the appended claims to cover all such changes and modifications.

What is claimed is:

1. An oven comprising an interior oven compartment, an operable electric circuit, at least a panel movable into and out of said oven compartment to completely separate the same into a plurality of adjacent smaller compartments, said panel including heating means operable to heat said adjacent compartments in response to the operation of said electrical circuit, means to connect said heating means with said electrical circuit when said panel is moved into said compartment, and a plurality of control means included into said electrical circuit and positioned in each of said smaller compartments to control the range of operation of said heating means whereby each of said smaller compartments will have the same range of temperature.

2. An electric oven having an oven compartment, a plurality of panels fixed in said compartment to divide the same into a plurality of separately separate adjacent smaller oven compartments, said panels each including heating means operable in response to the operation of said electrical circuit to heat said adjacent smaller oven compartments, an operable electrical circuit including thermostatic means to control the operation of said electrical circuit and heating means to maintain the temperatures in each of said compartments within predetermined ranges, means connecting said heating means with said electrical circuit, and means in said oven compartment to enable said fixed panels to be inserted thereinto selectively to divide the same completely into said smaller compartments and to be removed therefrom selectively.

3. An electric oven as in claim 2, and a portable unit in each of said separated compartments, said unit including a plurality of shelves arranged in vertical tiered relation for supporting trays thereon and removable bodily from said oven compartments.

4. An electric oven as in claim 2, said panels each being disposed vertically in said oven compartment and including means cooperating with said oven to secure the same fixedly therein as an integral dividing wall thereof.

5. An electric oven as in claim 2, and said thermostatic means being located in each of said separated compartments.

References Cited in the file of this patent

UNITED STATES PATENTS

| Re. 14,286 | Mann | Apr. 17, 1917 |
| 1,903,477 | Rolfson | Apr. 11, 1933 |
| 2,491,420 | Scott | Dec. 13, 1949 |
| 2,552,143 | Brock | May 8, 1951 |
| 2,683,795 | Sheidler | July 13, 1954 |
| 2,758,193 | Mantofel | Aug. 7, 1956 |
| 2,790,886 | Fry | Apr. 30, 1957 |

FOREIGN PATENTS

| 354,430 | Great Britain | Aug. 13, 1931 |